(12) United States Patent
Jensen (10) Patent No.: US 6,402,653 B1
(45) Date of Patent: Jun. 11, 2002

(54) DRUM MOTOR

(75) Inventor: Jan S. Jensen, Rodovre (DK)

(73) Assignee: Interroll Holding AG, San Antonio (CH)

( * ) Notice: Subject to any disclaimer, the term of this patent is extended or adjusted under 35 U.S.C. 154(b) by 0 days.

(21) Appl. No.: 09/529,084

(22) PCT Filed: Oct. 6, 1998

(86) PCT No.: PCT/EP98/06345

§ 371 (c)(1),
(2), (4) Date: Jun. 16, 2000

(87) PCT Pub. No.: WO99/18369

PCT Pub. Date: Apr. 15, 1999

(30) Foreign Application Priority Data

Oct. 7, 1997 (DK) .................................. 1148/97
Jun. 8, 1998 (DK) .................................. 9800767

(51) Int. Cl.[7] ........................................ F16H 57/02
(52) U.S. Cl. .................................. 475/149; 475/337
(58) Field of Search ................... 475/149, 331, 475/337; 198/788, 791

(56) References Cited

U.S. PATENT DOCUMENTS

| 4,468,985 A | 9/1984 | Nilsson | |
| 4,825,727 A | 5/1989 | Komuro | |
| 4,926,715 A | 5/1990 | Hirt et al. | |
| 5,336,136 A | * 8/1994 | Jacqui | 475/337 |
| 5,413,209 A | * 5/1995 | Werner | 198/788 X |
| 5,429,558 A | * 7/1995 | Lagarde | 475/344 |

FOREIGN PATENT DOCUMENTS

| DE | 622453 | 11/1935 |
| DE | 3840281 A1 | 11/1988 |
| FR | 1489856 | 6/1966 |
| GB | 298471 | 10/1927 |

* cited by examiner

*Primary Examiner*—Charles A Marmor
*Assistant Examiner*—Ankur Parekh
(74) *Attorney, Agent, or Firm*—Coats & Bennett, P.L.L.C.

(57) ABSTRACT

The present invention relates to a drum motor (1) comprising a driving member (7), a gear transmission and a driven member, said gear transmission being constructed as a plurality of planet transmissions (18, 20, 22) in the form of sun wheels (130) and planet wheels (144) arranged successively in the interior of an internally toothed rim (100), said driven member being in the form of a cylindrical drum (3) which contains the driving member (7) and the toothed rim (100), and which rotates about a longitudinal axis A. The invention is characterized in that the toothed rim (100) is formed by at least two juxtaposed ring-shaped segments (110, 115, 125) which provide a separate annulus for each planet transmission, and that member (120, 122, 200) are provided to secure the ring-shaped segments (110, 115, 125) against mutual rotation about the longitudinal axis A.

14 Claims, 6 Drawing Sheets

DRUM MOTOR

BACKGROUND ART

The present invention relates to a drum motor comprising a driving means, a gear transmission, and a driven means, said gear transmission being constructed as a plurality of planet transmissions in the form of sun wheels and planet wheels arranged successively in the interior of an internally toothed rim, said driven means being in the form of a cylindrical drum which contains the driving means and the toothed rim, and which rotates about a longitudinal axis A.

Drum motors of this type are generally known, see e.g. U.S. Pat. No. 5,429,558 and Danish Utility Model No. 95 00427.

A considerable problem associated with the conventional drum motors is that the production of drum motors having different gear transmissions requires a large number of different components, viz. toothed rims of lengths corresponding to the number of gear transmissions which are mounted internally in the drum motor. Furthermore, it is a considerable problem that the teeth of the toothed rim in the known drum motors are subjected to wear in the area at the last planet transmission most remote from the electric motor where a considerable force is to be transferred between the teeth. This wear has necessitated exchange of the entire toothed rim and thus resulted in increased operating costs.

DISCLOSURE OF THE INVENTION

The invention is intended to solve these problems, in that the toothed rim according to the invention is formed by at least two juxtaposed ring-shaped segments, and that means are provided to secure the ring-shaped segments against relative rotation about the longitudinal axis A.

In this context the term "juxtaposed" means that the segments are arranged side by side to form a tubular body. The term "ring-shaped segments" means relatively flat elements having teeth arranged on an internal wall which defines a circular through opening. The segments are moreover defined by a preferably approximately circular external wall opposite the teeth. The external wall, however, may assume another geometrical shape.

According to a preferred embodiment, the number of ring-shaped segments corresponds to the number of planet transmissions. Furthermore, the toothed rim may advantageously incorporate ring-shaped segments which are made of different materials, and which may thereby be adapted to the applied forces.

It is preferred that the securing means are formed by complementary engagement means provided on the ring-shaped segments, and that the ring-shaped segments have an identical geometrical shape. The latter gives considerable advantages in terms of economy and production. It is particularly preferred that the complementary engagement means are provided as recesses and projections formed on the external wall of the segments opposite the teeth.

In particular applications it may moreover be an advantage that the ring-shaped segments are embedded in a cylindrical jacket which secures the segments against relative rotation. The segments may hereby be constructed as simple, internally toothed rings or rims, which are secured by the embedment.

To facilitate mounting and to ensure a reliable guide of the planet transmissions, the ring-shaped segments may moreover be provided with stops which prevent displacement of the planet transmissions in a direction toward the longitudinal axis A.

The possibility of constructing the toothed rim segments with different internal diameters, but preferably substantially the same external diameter, provides a high degree of freedom in the selection of the transmission ratio of the drum motor.

The invention will be described more fully below with reference to two embodiments. In the drawing.

BRIEF DESCRIPTION OF DRAWINGS

BEST MODE FOR CARRYING OUT THE INVENTION

In the following, identical elements will be designated by identical reference numerals.

Figure 1:
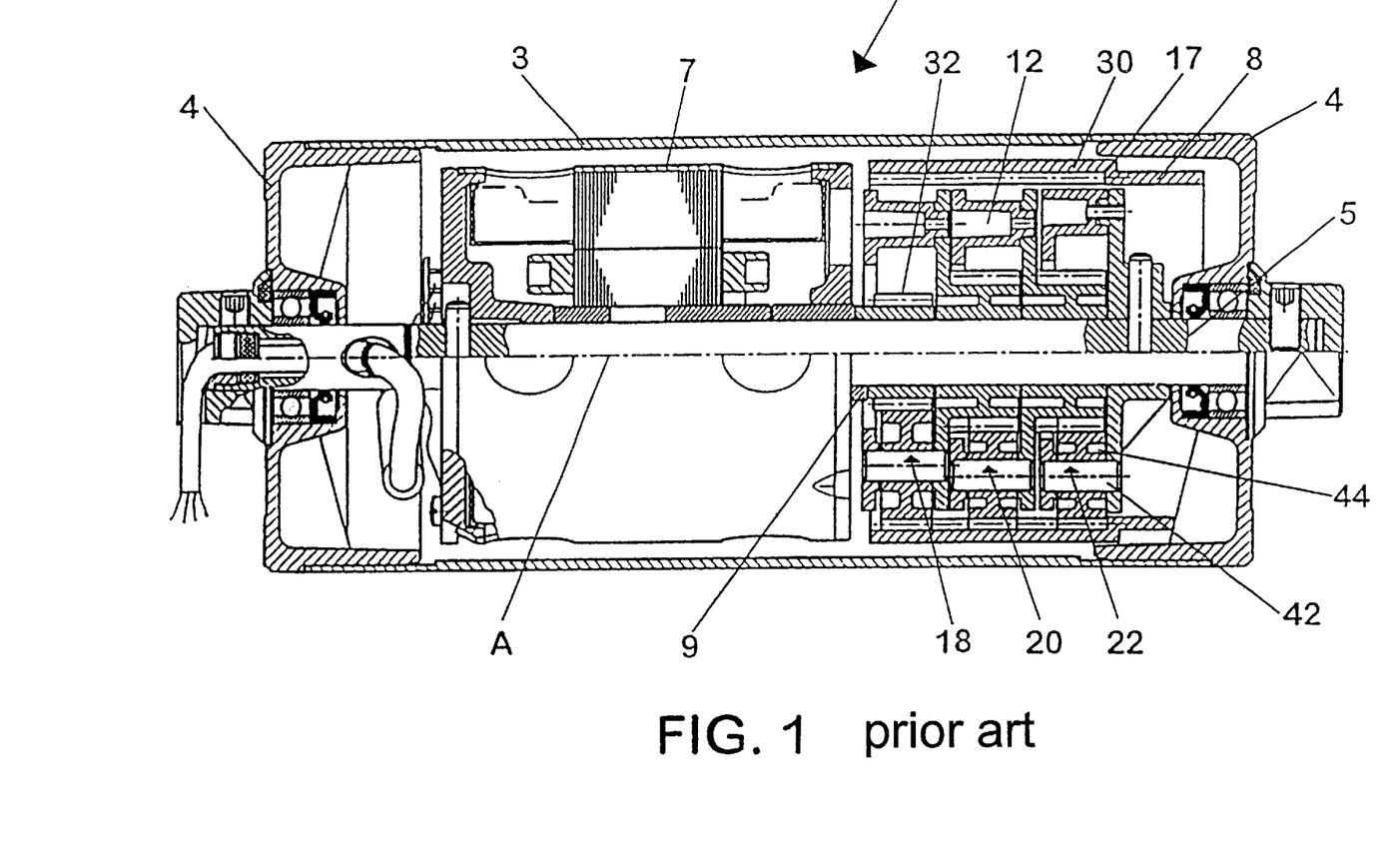
FIG. 1 is a longitudinal cross-section through a conventional drum motor.

FIG. 1 shows a cross-section through a conventional drum motor 1 and illustrates the ordinary components of a drum motor 1, viz. a cylindrical drum 3 with end jackets 4 through which a shaft 5 fixedly mounted at both ends extends. The shaft 5 mounts a driving means in the form of an electric motor 7 with a drive tap 9 connected to a gear transmission capable of providing a desired speed of rotation of the cylindrical drum 3 about the axis A. The shown drum motor 1 is normally used as a drive means for a conveyor belt, where the belt engages the cylindrical drum 3 which, when rotating, drives the conveyor belt forwards.

The gear transmission shown in FIG. 1 conventionally consists of a plurality of planet transmissions 18, 20, 22 arranged successively and having sun wheels and planet wheels, which are guided in the interior of an internally toothed and tubular rim 30. The number of planet transmissions determines the transmission ratio.

As will be seen, the sun wheel 32 in the first planet transmission 18 closest to the electric motor 7 is connected to the drive tap 9 of the electric motor 7, and the rotary shafts 42 of the planet wheels 44 in the last planet transmission 22 are prevented from rotating about the axis A. The enclosing toothed rim 30 is fixedly connected to the cylindrical drum 3 via an integral transitional portion 8 which extends into the end jacket 4. When the sun wheel 32 in the first planet transmission 18 is caused to rotate, the toothed rim 30, and thereby the cylindrical drum 3, will rotate at a speed corresponding to the transmission ratio.

Figure 2:
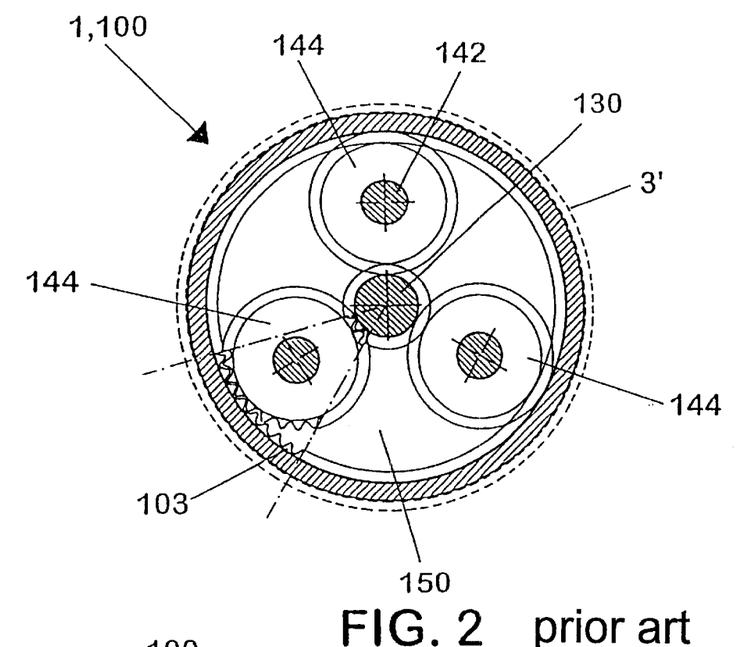
FIG. 2 is a cross-section perpendicular to the longitudinal axis through a similar conventional drum motor.

FIG. 2, seen from the end, shows a cross-section through a similar toothed rim. In this variant, the drum 3' directly engages the toothed rim, as illustrated in broken line. The figure shows the structure of the planet transmission as it is traditionally constructed. The planet transmission is formed by a sun wheel 130 with three planet wheels 144. The planet wheels 144 are inserted between two flat rings, of which a rear ring 150 is shown in the figure. As will also be seen from the cross-section in FIG. 1, the sun wheels are constructed as a protruding part arranged on the rear flat ring of a planet transmission situated in front and thereby rotate at the same speed as this ring. In the production of the drum motor, the planet transmissions are moved into the toothed rim from one end until they meet a stop, which is shown at the reference numeral 17 in FIG. 1, at the other end. The through shaft 5 is then passed through the toothed rim and the planet transmissions, said sun wheels 130 being formed with a central opening so that they can rotate freely about the shaft 5 in use.

As mentioned initially, a considerable problem associated with this type of conventional drum motors is that the production of drum motors with different gear transmissions requires toothed rims 1 of different lengths corresponding to the number of planet transmissions which are mounted internally in the drum motor. Further, it is a considerable problem that great wear of the teeth occurs in certain areas of the toothed rim. For example, in the structure shown, a considerable force is to be transferred between the teeth of the planet wheels 42 most remote from the drive tap 9 and the toothed rim 30. This wear has previously necessitated exchange of the entire toothed rim and thereby caused increased operating costs.

Figure 3:
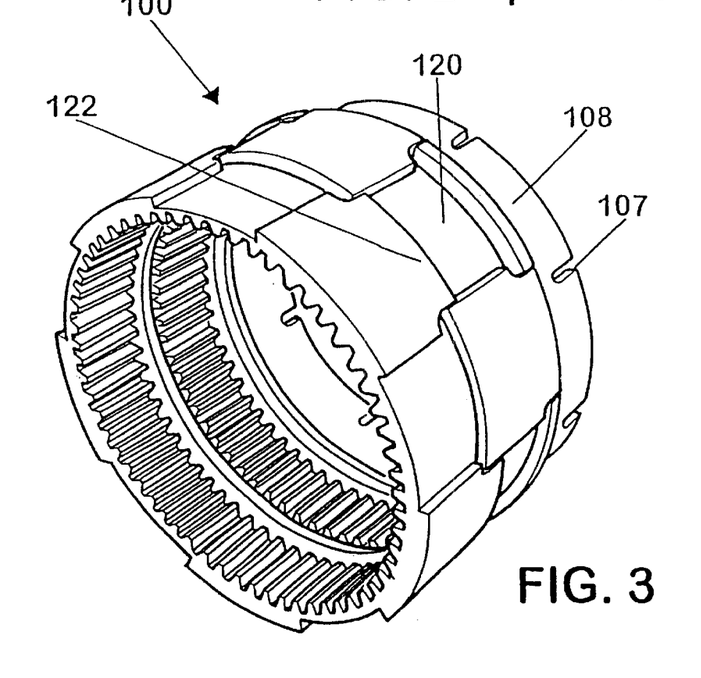
FIG. 3 is a perspective view of a toothed rim according to the invention.

FIG. 3 shows an embodiment of the special toothed rim 100 according to the invention. The shown toothed rim 100 is intended for a total of two successively arranged planet transmissions, and at one end to the right in the drawing, it is provided with a transitional portion 108 having engagement means 107 which cooperate with a disc-shaped end jacket (not shown) forming an end wall for the drum motor, just as explained with reference to FIG. 1. The toothed rim 100 is moreover connected with the enclosing cylindrical drum, which may take place directly or indirectly via the end jacket.

Figure 4:
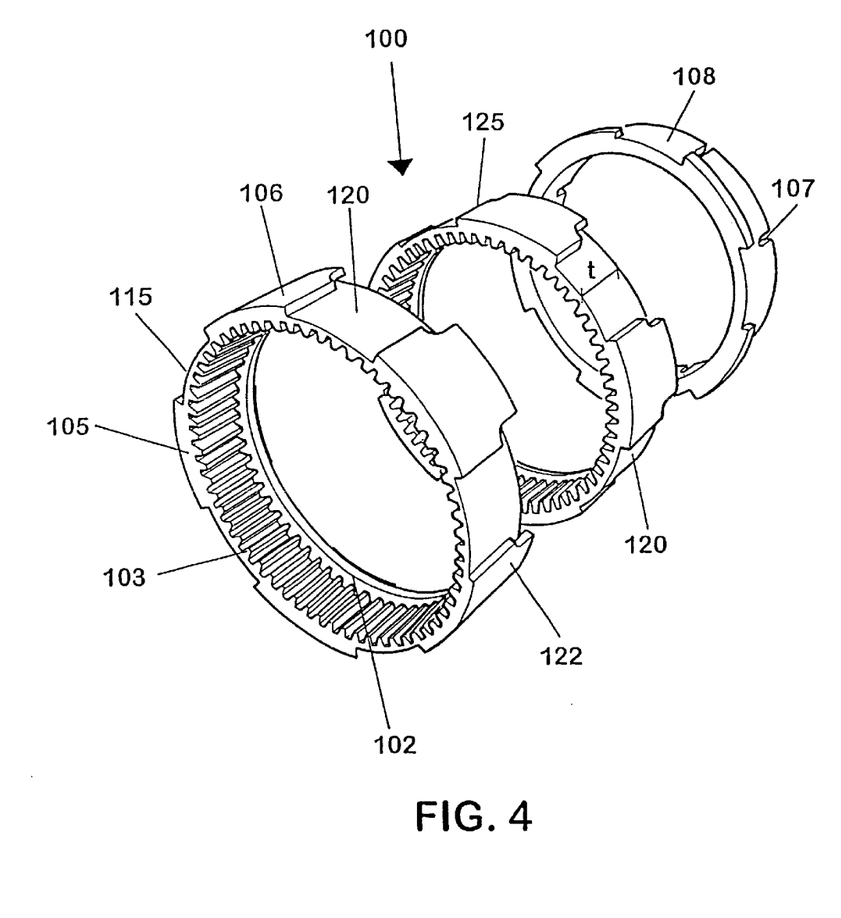
FIG. 4 is a perspective and exploded view of the toothed rim of FIG. 3.

According to the invention, the toothed rim 100 shown in FIG. 3 is formed by a number of separate ring-shaped toothed rim segments, which are shown more fully in FIG. 4. As mentioned, the embodiment shown includes two such ring-shaped toothed rim segments 115, 125 to form the toothed rim 100, and also the transitional portion 108 is provided as a separate ring-shaped and preferably toothed element. The engagement means 107 may be provided as slots which receive internal projections on the end jacket, so that the end jacket, and thereby the drum, rotates together with the toothed rim 100. Owing to the mounting of the drum motor, it is preferred to use the same number of segments as the number of planet transmissions, as will be explained below. Thus, the number of toothed rim segments 115, 125 incorporated in a given drum motor will usually depend on the desired transmission ratio, i.e. the number of planet transmissions.

As will be seen, the individual ring-shaped toothed rim segments 115, 125 are provided with an internal toothing 103 which engages the planet wheel of the drum motor when the planet transmissions are inserted in the toothed rim 100. The toothed rim segments are moreover defined by an external wall 106 opposite the teeth 103, and this external wall 106 follows a circle which is concentric with the internal toothed wall of the segments. This shape is expedient, as the segments may hereby be inserted into a cylindrical drum 3 and follow its contour, as shown in FIG. 2. The front and rear sides 105 of the segments preferably extend perpendicularly to the internal wall and the external wall 106.

In the embodiment shown, the toothed rim segments 115, 125 are moreover provided with recesses 120 and projections 122 formed on the external wall 106. The recesses 120 are arranged offset along the periphery of the segments 115, 125, thereby allowing the segments 115, 125 to be assembled with each other by inserting the projections 122 of a segment into associated recesses 120 in an adjacent segment. With the recesses 120 and the projections 122 suitably arranged, identical toothed rim segments may be used to construct a toothed rim 100, which, prior to being assembled, are merely to be oriented correctly to allow said insertion. On the basis of a single type of toothed rim segments 115, 125 of the same geometrical shape, it is thus possible to form a tubular toothed rim 100 of a length corresponding to the number of segments 115, 125 multiplied by the segment thickness "t", as this dimension is defined in FIG. 3. It is noted that the assembly is merely to prevent relative rotation of the toothed rim segments, and that the assembly does not necessarily have to be arranged to lock the segments against axial separation as well. As mentioned, such separation might be needed in the service of the drum motor.

Figure 5:
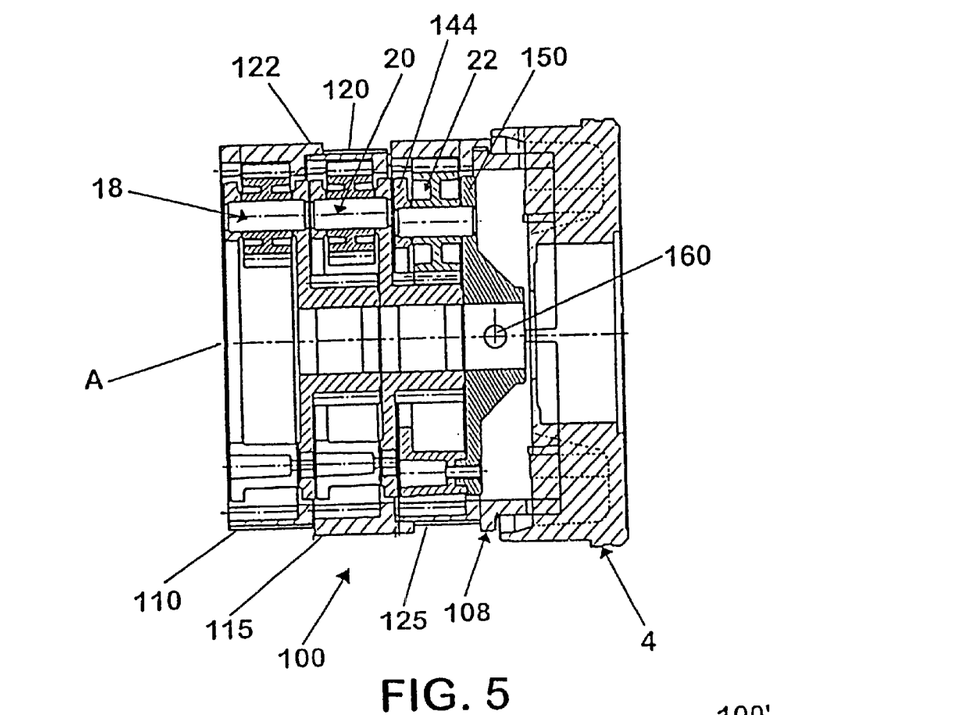
FIG. 5 is a longitudinal cross-section through a toothed rim according to the invention with the planet transmissions inserted.

In FIG. 5, the assembled toothed rim 100 with inserted planet transmissions 18, 20, 22 is shown in cross-section, the toothed rim 100 being likewise provided with the ring-shaped transitional portion 108 shown in FIGS. 3 and 4 and with an end jacket 4 in engagement with this transitional portion 108. In this case, the shown toothed rim is composed of three segments 110, 115, 125 with projections 122 and recesses 120, and the segments are hereby prevented from rotating with respect to each other about the longitudinal axis of rotation A. In the final assembly of the drum motor the through shaft 5 (FIG. 1) is passed through the toothed rim 100 and the planet transmissions 18, 20,22 and locked to the last planet transmission 22 closest to the transitional portion 108 by means of a pin which is passed through a transverse opening 160 in a projection provided on the rear flat ring 150 on which the planet wheels 144 are mounted. This planet transmission 22 is hereby fixed, so that the planet wheels can only rotate about their own shaft 144 and not about the longitudinal axis A.

To create a stable mount of the planet transmissions in an associated segment, each toothed rim segment is preferably provided with an annular wall 102 along one edge. This wall 102 appears most clearly from FIG. 4. The annular wall 102 forms an end stop with which the planet wheels engage, and thereby ensures correct insertion into the toothed rim segment in the mounting of the planet transmissions in the segments. The end stop is preferably provided by giving the teeth 103 of the toothed rim segments a smaller length than the segment thickness "t", whereby said annular wall 102 is formed between each tooth at the end of the segments. The described guide can also advantageously reduce vibrations and noise, if the length of the teeth of the planet wheels is adapted accurately to the teeth 103 of the segments. When a planet transmission is inserted into a segment, it is thus carefully guided on one hand by the wall 102 and on the other hand by the adjoining planet transmission.

When the toothed rim is formed by a plurality of segments of a substantially identical shape, it will not only be possible to produce toothed rims corresponding to a desired gear transmission, i.e. with a desired length, with a single standard component or with quite few standard components, but it will also be possible to adapt the constituent materials to the wear on a given part of the toothed rim. It is thus possible to use toothed rim segments formed of different materials, so that segments of e.g. hardened steel may be incorporated in certain areas of the toothed rim, while segments made of a plastics material of a poorer wear strength may be incorporated in other areas. This results in a considerable saving of material over the conventional toothed rims, which have previously just allowed two options, viz. either to make the entire toothed rim of a very durable and thereby also expensive material to ensure a long service life of the toothed rim, or to make the entire toothed rim of a less expensive and thereby less durable material, which, however, will require service of the drum motor at short intervals to check the state of the toothed rim.

Figure 6:
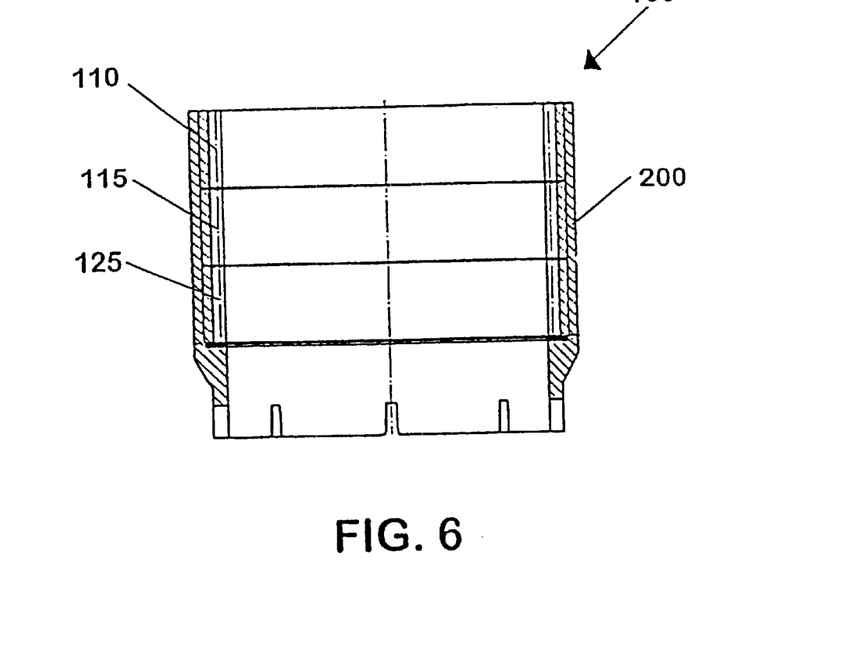
FIG. 6 illustrates an alternative embodiment of a toothed rim.

FIG. 6 shows an alternative embodiment of a toothed rim 100' formed by three segments 110,115,125. In this case, the toothed rim segments are formed of different materials selected in accordance with the wear. The individual segments 110,115,125, however, are not provided with recesses with associated projections, but they are, as described with reference to FIGS. 3–5, encased in a cylindrical jacket 200 of a suitable material which secures the individual segments 110,115,125 against relative rotation and forms the exterior, rotating surface of the toothed rim 100. The jacket 200 can be made in advance, preferably of aluminium, and be heated to allow the segments 110,115,125 to be freely introduced into the exterior. The subsequent cooling of the jacket 200 brings about the desired securing of the segments since, due to the cooling, the jacket is caused to squeeze around the segments. Alternatively, the segments 110,115,125 can be secured by encasing, the jacket 200 being configured of a suitable material, such as zinc. This solution is particularly suitable in case of small thicknesses, because it can ensure a good dimensional accuracy. Because of the encasing the individual segments are secured against relative rotation, so that the resulting, entire toothed rim rotates as a unit. When using various moulds corresponding to a desired number of segments selected in accordance with the required gear transmission, it is possible to make toothed rims, while still utilizing the advantages provided by the invention.

Figure 7:
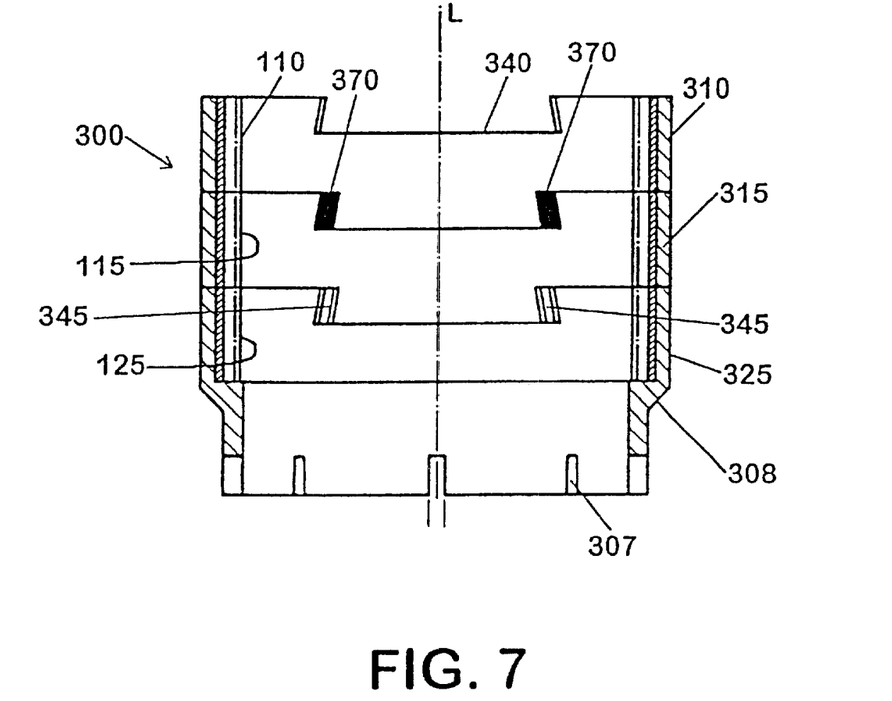
FIG. 7 illustrates a further alternative embodiment of a toothed rim.

FIG. 7 illustrates an alternative embodiment of the invention, wherein the exterior jacket shown in FIG. 6 has been replaced by a number of ring-shaped jacket elements 310,315,325 that are joined in joints that use the complementary engagement means described below to prevent relative rotation. The one ring-shaped jacket element 325 has a transition part 308 with engagement means 307 that can be caused to engage with a not shown end jacket 4 as described with reference to FIG. 3.

Interiorly of the jacket 300, a number of ring-shaped segments 110,115,125 are provided corresponding to the segments shown in FIG. 6, each of which is arranged to frictionally engage with a respective ring-shaped jacket element 310,315,325 in the manner described below and which are hereby secured against relative rotation. The segments 110,115,125 provided with internal toothing have a segment thickness "t" corresponding to the corresponding dimension of the ring-shaped jacket elements 310,315,325.

The solution shown in FIG. 7 is particularly convenient in situations where the planet exchanges and the ring-shaped segments 110,115,125 exhibit unavoidable deviations from the specified shape as a consequence of e.g. production conditions. This may be expressed in e.g. the centre of the sun wheel 130 not coinciding with the centres of the ring-shaped segments 110,115,125 whereby the sun wheel 130 will, upon rotation, move back and forth transversally to the longitudinal axis A of the motor. These movements give rise to noise problems in the motor and this embodiment provides a solution by allowing a play in the joint between the ring-shaped jacket elements 310,315,325 and by embedding a vibration reducing body in said joints.

Figure 8A:
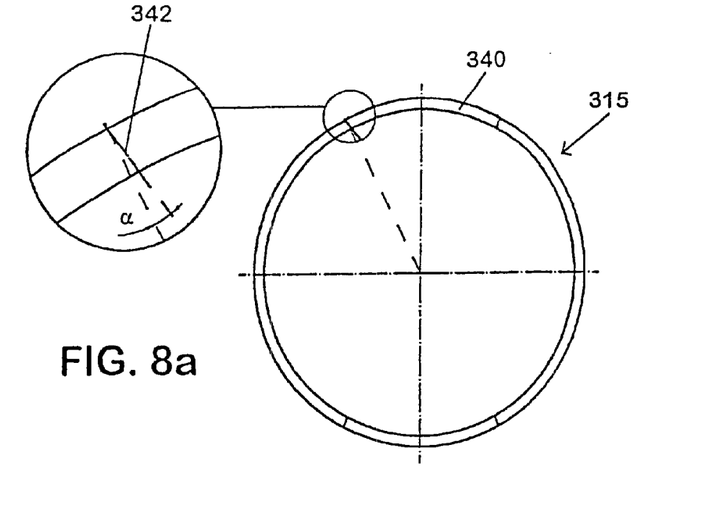
FIG. 8a, 8b and 8c illustrate an ring-shaped jacket element for use in the toothed rim shown in FIG. 7, seen from the front, the rear and in a sectional view seen in the direction indicated by A—A in FIG. 8b, respectively.
Figure 8B:
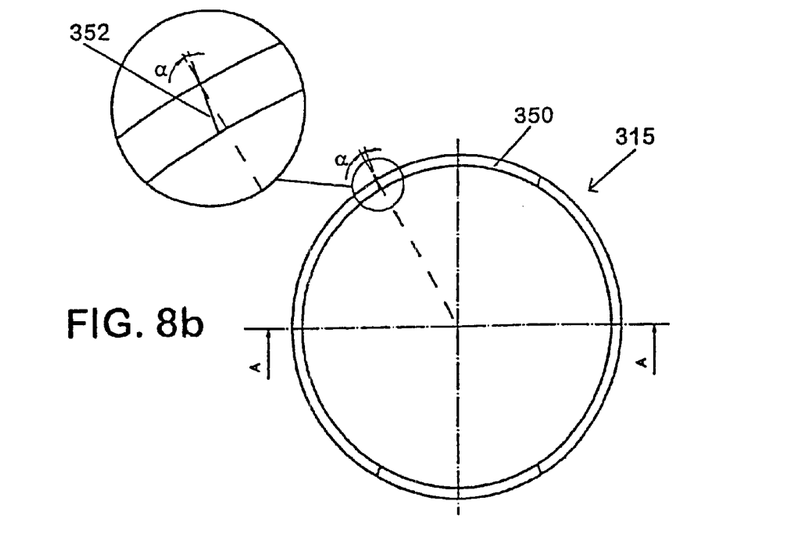
Figure 8C:
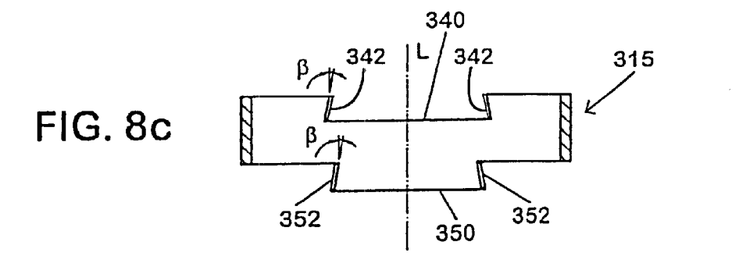

As shown in FIGS. 8a,8b and 8c which depict one of the ring-shaped jacket elements 315, the jacket elements 310, 315,325 are configured with complementary engagement means 340,350 that form a dovetail connection, since the space 345 (FIG. 7) between the shown adjoining lateral surfaces 342,352 in the dovetail connection have the vibration reducing body 370 described in further detail below arranged therein. As shown, the dovetail connection proper comprises a dovetail tenon 350 and a dovetail recess 340, the lateral surfaces designated by the reference numerals 342, 352 extending at an angle $\beta$ of between about 8° and about 12°, preferably about 10°, relative to the longitudinal direction L. The lateral surfaces 342,352 are also configured with an oppositely oriented inclination, whereby the width of the space 345 formed between the lateral surfaces 342,352 is gradually narrowed in a direction away from the longitudinal axis L, i.e. towards the exterior surface of the jacket elements, as is indicated in FIG. 7. Preferably, the lateral surfaces 342,352 form a small angle $\alpha$ of between about 8° and about 12°, preferably about 10°, relative to the radial direction. This will be most apparent from FIGS. 8a and 8b.

Figure 9:
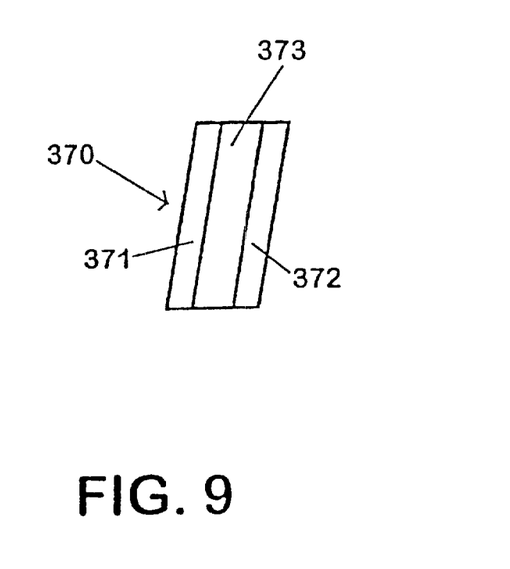
FIG. 9 shows an exemplary view of a vibration reducing and interlocking body intended for insertion between two of the jacket elements shown in FIG. 8.

FIG. 7 illustrates two vibration reducing bodies 370 introduced into a space 345 so as to fill the space 345. The elements 370 are preferably made of a rubber material and are outlined in FIG. 9 from which it will appear that each element 370 has a shape corresponding to the shape of the space 345, said element 370 having inclined lateral edges 371,372 that abut on the lateral surfaces 342,352 when the element 370 has been introduced into the space 345. The lateral edges 371,372 converge against the upper surface 373 of the element 370, which can be seen from the exterior surface of the jacket elements when the jacket elements 310,315,325 are joined.

The elements of the jacket 300 can preferably be made—with due regard to their shapes and the loads imposed thereon—of an aluminium material, said material being, during arrangement interiorly of the segments 110,115,125, heated and subsequently cooled. The dovetail recess 340 is configured with such dimension that the dovetail tenon 350 can be introduced axially into the recess. When the ring-shaped jacket elements 310,315,325 are subsequently cooled, the vibration reducing bodies 370 are introduced into the spaces 345, thereby making the dovetail joining effective and ensuring that the jacket elements cannot be torn apart.

Owing to the resiliency of the vibration reducing body, relative movements may occur between the jacket elements 310,315,325 transversally to the longitudinal axis A of the motor, but due the presence of the rubber material these movements do not give rise to significant noise.

To make the toothed rim segments described above, relatively inexpensive plastics materials, such as POM, PA6 (polyamide)/PA6 (glass fibre reinforced), or PP may advantageously be used. Use may also be made of light metals, such as aluminium or zinc, or other more wear-resistant materials, such as hardened steel alloys or powder metal. Segments of these materials may be composed freely, according to the loads and the noise and vibration conditions.

Although the toothed rim segments 110, 115, 125 have been described above as ring-shaped elements of substantially the same external and internal diameters (measured to the tip of the teeth), it will be appreciated that the segments may very well be made with different internal diameters or tooth profiles, thereby providing a high degree of freedom as regards the transmission ratio of the drum motor 1 by selection of corresponding diameters and tooth profiles of the planet wheels 144. Precisely because the toothed rim 100 is composed of several segments it is possible to insert the planet transmissions successively without the varying internal diameters preventing this insertion.

What is claimed is:

1. A drum motor comprising a driving means, a gear transmission and a driven means, said gear transmission being constructed of a plurality of planet transmissions having sun wheels and planet wheels arranged successively in the interior of an internally toothed rim, said driven means having a cylindrical drum which contains the driving means and the toothed rim, and which rotates about a longitudinal axis, said toothed rim is formed by at least two juxtaposed ring-shaped segments, and securing means prevent the ring-shaped segments against relative rotation about the longitudinal axis, said securing means formed by complementary engagement means formed on the ring-shaped segments.

2. A drum motor according to claim 1, characterized in that the number of ring-shaped segments corresponds to the number of planet transmissions.

3. A drum motor according to claim 1 characterized in that the toothed rim incorporates ring-shaped segments made of different materials.

4. A drum motor according to claim 1, characterized in that the ring-shaped segments have an identical geometrical shape.

5. A drum motor according to claim 1, characterized in that the complementary engagement means are provided as recesses and projections formed on the external wall of the ring-shaped segments opposite the teeth or on the sides.

6. A drum motor according to claim 1, characterized in that the ring-shaped segments are provided with stops which prevent displacement of the planet transmissions in the direction of the longitudinal axis.

7. A drum motor according to claim 1, characterized in that the ring-shaped segments are formed with different inside diameters, having substantially the same outside diameter.

8. A drum motor comprising:

a drive assembly;

a gear assembly operatively connected to said drive assembly;

a plurality of ring-shaped elements secured together forming a toothed rim for receiving said gear assembly, each of said ring-shaped elements being fastened together to prevent relative rotation; and a cylindrical drum sized to contain the drive assembly, gear assembly, and plurality of ring-shaped elements.

9. The drum motor of claim 8, wherein each of said ring-shaped elements includes complimentary recesses and projections that mate together to prevent any of said ring-shaped elements from rotating independently.

10. The drum motor of claim 9, wherein each of said ring-shaped elements has an internally toothed rim for mating with said gear assembly.

11. The motor of claim 8, wherein said gear assembly includes a plurality of planet transmissions each having a sun wheel and at least one planet wheel.

12. The motor of claim 11, wherein said gear assembly includes a separate planet transmission within each of said ring-shaped elements.

13. A drum motor comprising a driving means, a gear transmission, and a driven means, said gear transmission being constructed of a plurality of planet transmissions having sun wheels and planet wheels arranged successively in the interior of an internally toothed rim, said driven means having a cylindrical drum which contains the driving means and the toothed rim, and which rotates about a longitudinal axis, said toothed rim is formed by at least two juxtaposed ring-shaped segments, and securing means prevent the ring-shaped segments against relative rotation about the longitudinal axis, said securing means formed by a cylindrical jacket in which the ring-shaped segments are encased.

14. A drum motor according to claim 13, characterized in that the cylindrical jacket is composed of ring-shaped jacket elements that are axially connected in the direction of the longitudinal axis, but arranged for allowing relative movements in a direction transversally to the longitudinal axis, and that a vibration reducing material is inserted in the joint between the ring-shaped jacket elements.

\* \* \* \* \*